United States Patent Office 2,815,926
Patented Dec. 10, 1957

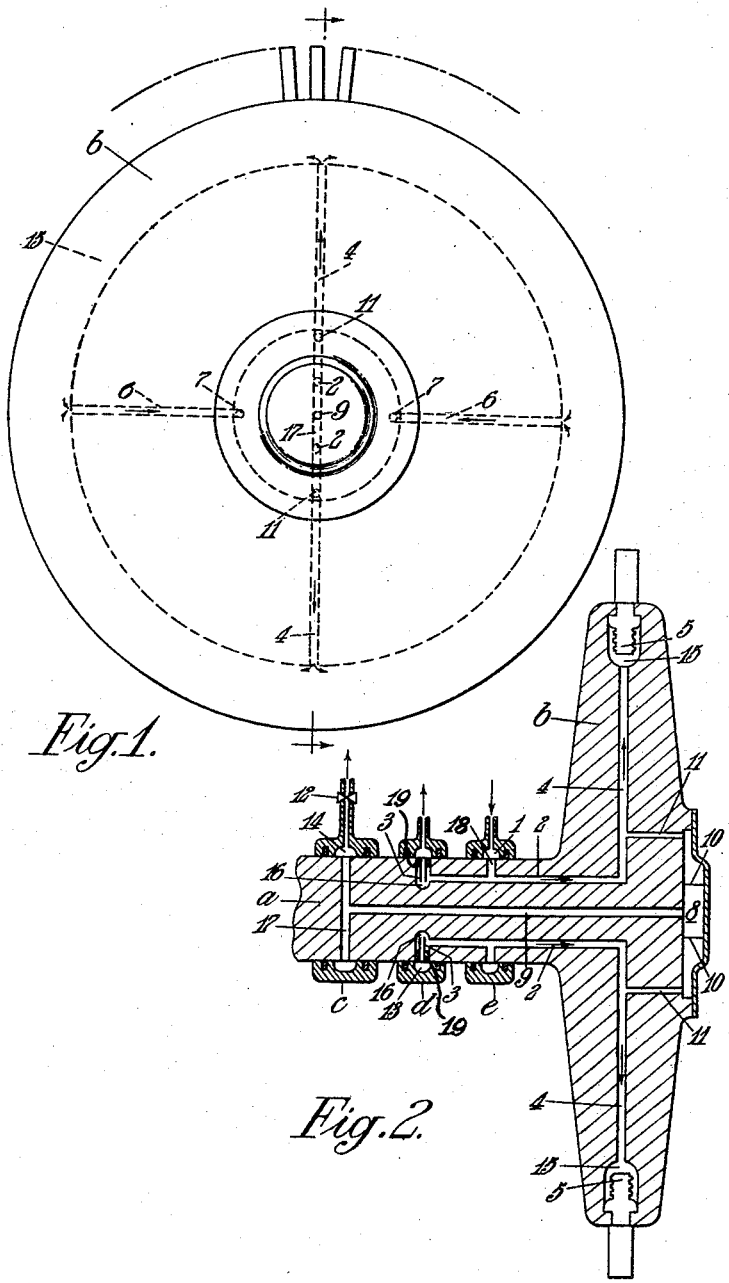

2,815,926

COOLING OF GAS TURBINE ROTORS

Vincent Walker, Monkseaton, England, assignor to The Parsons and Marine Engineering Turbine Research and Development Association, Wallsend, England Application March 10, 1954, Serial No. 415,391

Claims priority, application Great Britain March 19, 1953

3 Claims. (Cl. 253—39.15)

This invention relates to the cooling of gas turbine rotors by liquid supplied to the blades and the surface thereof and has for its object to use the latent heat capacity of the liquid to carry away heat from the blades and rotor surface. If, for example, the cooling liquid is water, the heat carried away from the rotor produces steam which can be used externally for heating or producing power.

The invention consists in a gas turbine having features as set forth in the claims appended hereto.

Referring to the accompanying diagrammatic drawings:

Figure 1 is an end view of a gas turbine rotor embodying the present invention in one form; and Figure 2 is a longitudinal sectional view thereof.

In carrying the invention into effect according to one convenient form by way of example as shown in Figures 1 and 2, the shaft $a$ of a turbine rotor $b$ is furnished with three separate encircling rings $c$, $d$, $e$, each furnished with an internal passage leading to an externally connected pipe, one ($e$) having formed therein an annular water supply duct 1, a second ($d$) having formed therein an annular water spill duct 13 and a third ($c$) having formed therein an annular steam outlet duct 14 controlled by a pressure loaded non-return valve 12.

The duct 1 communicates with two diametrically opposed radial holes 18 in the rotor shaft $a$ each communicating with a longitudinal duct 2 leading to a radial duct 4, the two radial ducts being diametrically disposed on the rotor and communicating at their outer ends with a peripheral annular space 15 adjacent to the bases 5 of the turbine blades.

The longitudinal ducts 2 also extend towards the second annular duct 13 and terminate in peripherally open radial chambers 16 formed in the shaft and spaced 180° apart so as to lie on a diameter thereof. Each of these radial chambers is closed at its periphery by a plug 19 through which inwardly projects radially a short length of pipe 3. These pipes 3 are open at both ends and the inner ends act as weirs over which water passes into the tubes and thence into the chambers 16. The tubes 5 thus constitute spill devices. The third internal annular duct 14 communicates with a diametrical hole 17 through the rotor shaft which is in communication with a longitudinal duct 9 concentric with the rotor shaft axis. This duct constitutes a steam outlet duct as explained below.

Water is supplied to the duct 1 at a pressure high enough to pass the water inwards to the passages 2 against the centrifugal force set up by rotation of the shaft $a$. The pressure in the passages 2 is controlled by the spill device 3; if the water supply pressure becomes unnecessarily high, then the excess pressure in the passages 2 is relieved by flow into the spill tubes 3. The maintenance of a small spill flow during operation also ensures that the water supply to the rotor is adequate.

Cooling water flows out to the rotor blades along passages 4 and then circumferentially, picking up heat from the blade roots 5. The water returns along further radial passages 6 and 7 in the rotor $b$ into a water evaporating space 8 in the rotor.

The water passages are so arranged that in spite of the lowered density of the water returning along 6 and 7 there is insufficient pressure available to return the water into the steam duct 9. The free water surface takes up some position 10. The connecting passages 11 allow water to recirculate by way of 11, 4, 15, 6 and 7 and it becomes further raised in temperature. Eventually the water temperature at 10 becomes sufficiently high for the associated vapour pressure to open the non-return valve 12. Thereafter a steady rate of steam generation obtains and make-up water enters along 2.

The thermal pumping force in the circuit 11, 4, 15, 6, 7 is used to produce a rapid circulation over the blade roots with a correspondingly large heat transfer coefficient.

The rate of water supply to the turbine is small since the latent heat of vaporisation is employed for taking out heat. Thus flow rates are low except where high flow rates are needed, namely, in the passage around the blade roots.

The turbine blade temperature can be controlled to some extent by regulating the steam pressure through the load on the valve 12 and thereby raising or lowering the temperature of the water circulating around the blade roots.

I claim:

1. A gas turbine rotor comprising a shaft, blades having roots mounted in the periphery of said rotor, a median bore in said shaft and the rotor, a radial steam outlet duct in said shaft and a liquid evaporation space in said rotor both communicating with and extending to a greater distance radially outwards than said bore, a radial liquid supply duct and a radial liquid discharge duct in said shaft, at least one radial duct in said rotor, an annular peripheral space located in the rotor in cooperating relation to said blade roots, at least one axial duct in said shaft spaced from said bore and communicating with said liquid supply and discharge ducts with said liquid evaporation space and with said annular peripheral space by way of said radial rotor duct, a spill device in said liquid discharge duct serving to maintain a substantially constant annular liquid level in said liquid evaporation space during shaft rotation, a plurality of ducts from said peripheral space to said liquid evaporation space, a vapour outlet duct co-acting with said radial steam outlet shaft duct, a non-return valve in said vapour outlet duct, liquid supply means co-acting with said liquid supply shaft duct and liquid discharge means co-acting with said liquid discharge shaft duct.

2. A gas turbine rotor comprising a shaft, blades having roots mounted in the periphery of said rotor, an annular peripheral space in said rotor in cooperating relation to said blade roots, a plurality of ducts in said rotor communicating with said space, a median bore in said shaft, a fixed ring member closely encircling said shaft, a vapour outlet channel and a vapour outlet duct in said ring member, a non-return valve in said vapour outlet duct, a radial vapour outlet duct in said shaft connecting said median bore with said vapour outlet channel, a liquid evaporation chamber in said rotor communicating with said median bore and extending a greater distance radially outwards than said median bore, at least two radial ducts in said shaft relatively spaced apart axially, at least one axial duct in said rotor spaced from said bore and connected to said radial ducts, to at least one of said rotor ducts and to said liquid evaporation chamber at a point spaced from said median bore, means for connecting another of said shaft ducts to said liquid evaporation chamber, means for supplying liquid continuously to one of said radial shaft ducts, means for collecting liquid discharged from the other of said radial shaft ducts and a spill device in said latter duct serving to maintain a substantially constant annular liquid level in said liquid evaporation chamber during shaft rotation.

3. A gas turbine rotor as claimed in claim 2 wherein said means for supplying liquid continuously to one of said radial shaft ducts and said means for collecting liquid discharged from the other of said radial shaft ducts comprise fixed ring members closely encircling said shaft and incorporating circumferential channels and ducts connected thereto.

References Cited in the file of this patent

UNITED STATES PATENTS

| | | |
|---|---|---|
| 2,073,605 | Belluzzo | Mar. 16, 1937 |
| 2,339,779 | Holzwarth | Jan. 25, 1944 |
| 2,369,795 | Planiol | Feb. 20, 1945 |

FOREIGN PATENTS

| | | |
|---|---|---|
| 195,736 | Switzerland | July 16, 1938 |
| 237,475 | Switzerland | Sept. 1, 1945 |